(12) United States Patent
Shknevsky et al.

(10) Patent No.: US 12,436,701 B2
(45) Date of Patent: Oct. 7, 2025

(54) SYSTEM AND METHOD FOR HASH-BASED DATA DEDUPLICATION

(71) Applicant: Dell Products L.P., Round Rock, TX (US)

(72) Inventors: Alexander Shknevsky, Fair Lawn, NJ (US); Uri Shabi, Tel Mond (IL); Vamsi K. Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 139 days.

(21) Appl. No.: 18/160,548

(22) Filed: Jan. 27, 2023

(65) Prior Publication Data

US 2024/0256165 A1 Aug. 1, 2024

(51) Int. Cl.
*G06F 3/06* (2006.01)

(52) U.S. Cl.
CPC .......... *G06F 3/0641* (2013.01); *G06F 3/0608* (2013.01); *G06F 3/067* (2013.01)

(58) Field of Classification Search
CPC ....... G06F 3/0641; G06F 3/0608; G06F 3/067
See application file for complete search history.

(56) References Cited

U.S. PATENT DOCUMENTS

| | | |
|---|---|---|
| 2021/0133117 A1* | 5/2021 Shabi | G06F 12/1009 |
| 2022/0027075 A1* | 1/2022 Garg | G06F 3/065 |

* cited by examiner

*Primary Examiner* — Jane W Benner
(74) *Attorney, Agent, or Firm* — Brian J. Colandreo; Heath M. Sargeant; Holland & Knight LLP

(57) ABSTRACT

A method, computer program product, and computing system for maintaining a pointer quantity count for each of a plurality of virtual mapping groups, wherein each virtual mapping group is associated with a duplicative data portion within a storage platform and each pointer quantity count defines the number of pointers included within the corresponding virtual mapping group; and obtaining a hash value for a specific duplicative data portion associated with a specific virtual mapping group if a specific pointer quantity count for the specific virtual mapping group is reduced to zero.

14 Claims, 4 Drawing Sheets

SYSTEM AND METHOD FOR HASH-BASED DATA DEDUPLICATION

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible.

Unfortunately, as the storage system is being utilized, multiple copies of single files may be stored on the storage system, resulting in considerable wasted storage space. In order to combat such duplicative storage of files, deduplication methodologies may be employed to identify and eliminate such redundant files. Unfortunately, such deduplication methodologies may require the use of cryptography (e.g., hash calculations) and, therefore, may be computationally expensive.

SUMMARY OF DISCLOSURE

In one implementation, a computer-implemented method is executed on a computing device and includes: maintaining a pointer quantity count for each of a plurality of virtual mapping groups, wherein each virtual mapping group is associated with a duplicative data portion within a storage platform and each pointer quantity count defines the number of pointers included within the corresponding virtual mapping group; and obtaining a hash value for a specific duplicative data portion associated with a specific virtual mapping group if a specific pointer quantity count for the specific virtual mapping group is reduced to zero.

One or more of the following features may be included. A deduplication index may be searched for the occurrence of the hash value to define one of more occurrences of the hash value within the deduplication index; and the one of more occurrences of the hash value within the deduplication index may be removed. Maintaining a pointer quantity count for each of a plurality of virtual mapping groups may include one or more of: incrementing one or more pointer quantity counts when the number of pointers included within the corresponding one or more virtual mapping groups is increased; and decrementing one or more pointer quantity counts when the number of pointers included within the corresponding one or more virtual mapping groups is decreased. Obtaining a hash value for a specific duplicative data portion associated with a specific virtual mapping group if a specific pointer quantity count for the specific virtual mapping group is reduced to zero may include: obtaining the hash value for the specific duplicative data portion associated with the specific virtual mapping group from a local hash repository. A new data portion to be stored within the storage platform may be received; a new hash value for the new data portion may be calculated; and a deduplication index may be searched for the occurrence of the new hash value. If the new hash value does not occur within the deduplication index: the new data portion may be stored within the storage platform, a new virtual mapping group that is associated with the new data portion may be defined; and a pointer quantity count of one may be defined for the new virtual mapping group. If the new hash value does occur within the deduplication index: the new hash value may be associated with an existing duplicative data portion; an existing virtual mapping group that is associated with the existing duplicative data portion may be modified, and the pointer quantity count the existing virtual mapping group may be incremented.

In another implementation, a computer program product resides on a computer readable medium and has a plurality of instructions stored on it. When executed by a processor, the instructions cause the processor to perform operations including maintaining a pointer quantity count for each of a plurality of virtual mapping groups, wherein each virtual mapping group is associated with a duplicative data portion within a storage platform and each pointer quantity count defines the number of pointers included within the corresponding virtual mapping group; and obtaining a hash value for a specific duplicative data portion associated with a specific virtual mapping group if a specific pointer quantity count for the specific virtual mapping group is reduced to zero.

One or more of the following features may be included. A deduplication index may be searched for the occurrence of the hash value to define one of more occurrences of the hash value within the deduplication index; and the one of more occurrences of the hash value within the deduplication index may be removed. Maintaining a pointer quantity count for each of a plurality of virtual mapping groups may include one or more of: incrementing one or more pointer quantity counts when the number of pointers included within the corresponding one or more virtual mapping groups is increased; and decrementing one or more pointer quantity counts when the number of pointers included within the corresponding one or more virtual mapping groups is decreased. Obtaining a hash value for a specific duplicative data portion associated with a specific virtual mapping group if a specific pointer quantity count for the specific virtual mapping group is reduced to zero may include: obtaining the hash value for the specific duplicative data portion associated with the specific virtual mapping group from a local hash repository. A new data portion to be stored within the storage platform may be received; a new hash value for the new data portion may be calculated; and a deduplication index may be searched for the occurrence of the new hash value. If the new hash value does not occur within the deduplication index: the new data portion may be stored within the storage platform, a new virtual mapping group that is associated with the new data portion may be defined; and a pointer quantity count of one may be defined for the new virtual mapping group. If the new hash value does occur within the deduplication index: the new hash value may be associated with an existing duplicative data portion; an existing virtual mapping group that is associated with the existing duplicative data portion may be modified, and the pointer quantity count the existing virtual mapping group may be incremented.

In another implementation, a computing system includes a processor and memory is configured to perform operations including maintaining a pointer quantity count for each of a plurality of virtual mapping groups, wherein each virtual mapping group is associated with a duplicative data portion within a storage platform and each pointer quantity count defines the number of pointers included within the corresponding virtual mapping group; and obtaining a hash value for a specific duplicative data portion associated with a specific virtual mapping group if a specific pointer quantity count for the specific virtual mapping group is reduced to zero.

One or more of the following features may be included. A deduplication index may be searched for the occurrence of the hash value to define one of more occurrences of the hash value within the deduplication index; and the one of more occurrences of the hash value within the deduplication index may be removed. Maintaining a pointer quantity count for each of a plurality of virtual mapping groups may include one or more of: incrementing one or more pointer quantity counts when the number of pointers included within the corresponding one or more virtual mapping groups is increased; and decrementing one or more pointer quantity counts when the number of pointers included within the corresponding one or more virtual mapping groups is decreased. Obtaining a hash value for a specific duplicative data portion associated with a specific virtual mapping group if a specific pointer quantity count for the specific virtual mapping group is reduced to zero may include: obtaining the hash value for the specific duplicative data portion associated with the specific virtual mapping group from a local hash repository. A new data portion to be stored within the storage platform may be received; a new hash value for the new data portion may be calculated; and a deduplication index may be searched for the occurrence of the new hash value. If the new hash value does not occur within the deduplication index: the new data portion may be stored within the storage platform, a new virtual mapping group that is associated with the new data portion may be defined; and a pointer quantity count of one may be defined for the new virtual mapping group. If the new hash value does occur within the deduplication index: the new hash value may be associated with an existing duplicative data portion; an existing virtual mapping group that is associated with the existing duplicative data portion may be modified, and the pointer quantity count the existing virtual mapping group may be incremented.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
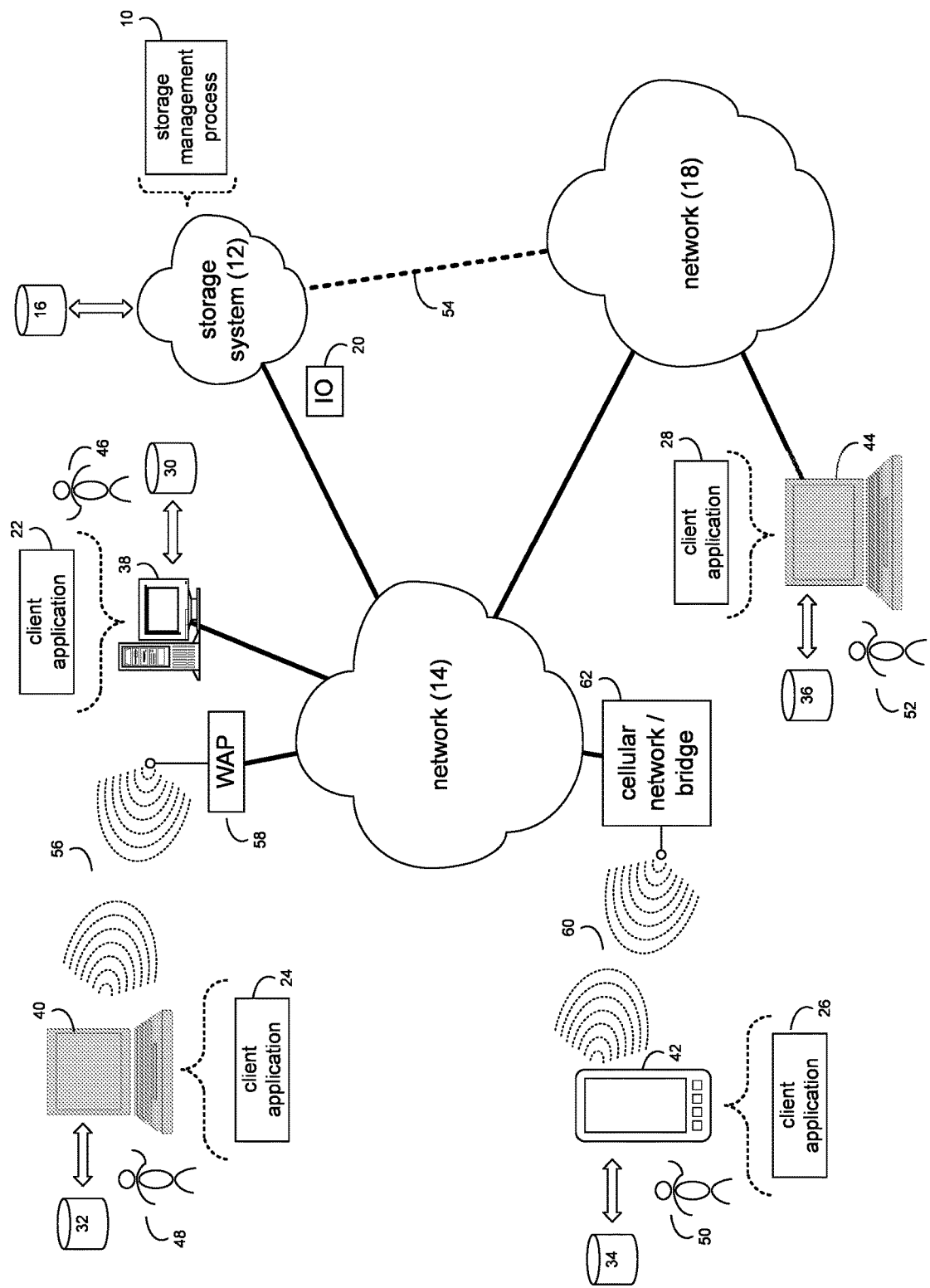
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
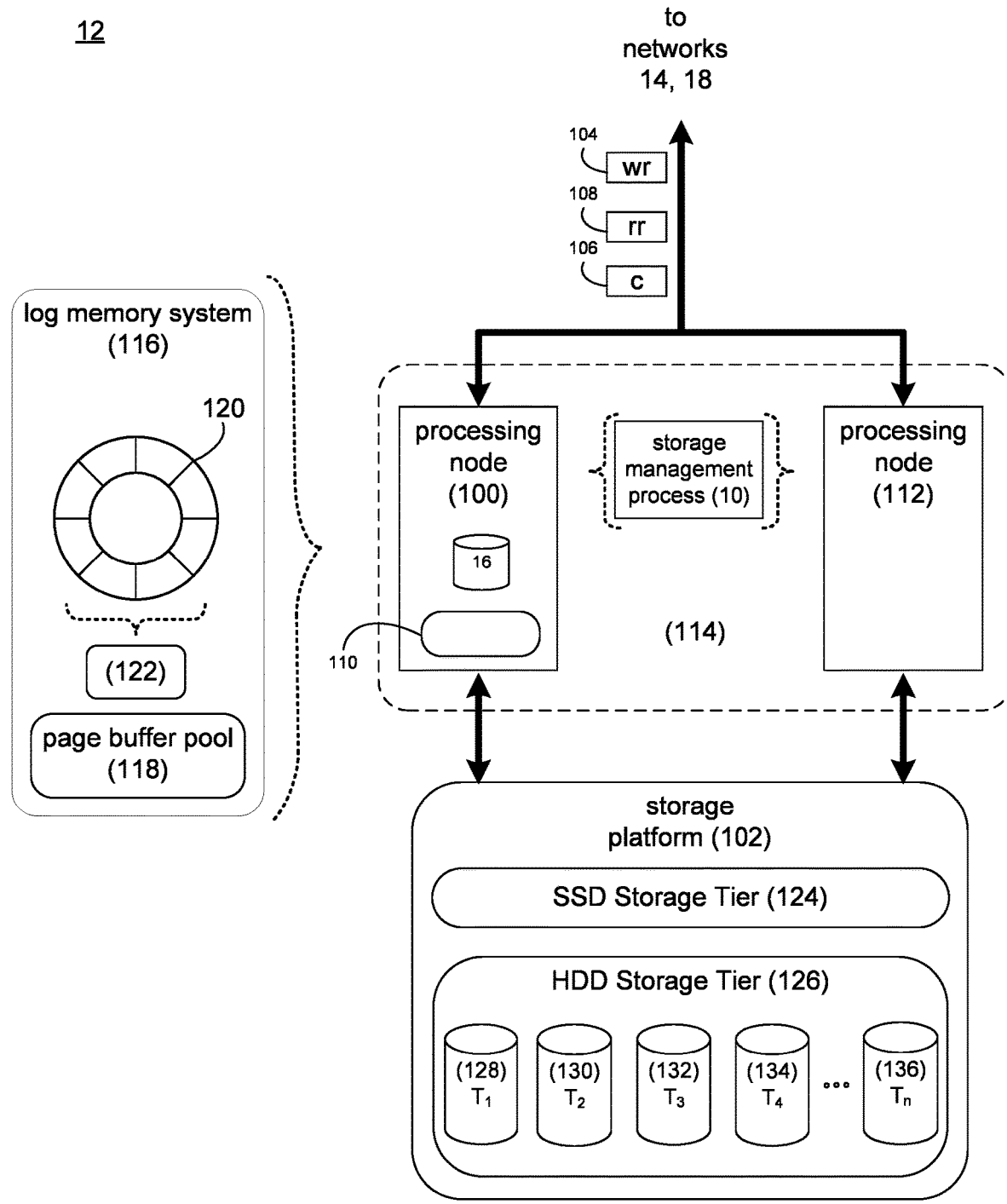
FIG. 2 is a diagrammatic view of the storage system of FIG. 1.

The Data Storage System:

Referring also to FIG. 2, there is shown a general implementation of storage system 12. In this general implementation, storage system 12 may include processing node 100, wherein processing node 100 may be configured to perform computational tasks and to store data within storage platform 102.

Depending upon the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability. Further, storage platform 102 may be a cloud-based storage platform that provides virtualized storage functionality to (in this example) users 46, 48, 50, 52.

As is known in the art, cloud storage is a model of computer data storage in which the digital data is stored in logical pools, said to be on "the cloud". The physical storage spans multiple servers (sometimes in multiple locations) and the physical environment is typically owned and managed by a hosting company. These cloud storage providers are responsible for keeping the data available and accessible, and the physical environment secured, protected, and running. People and organizations buy or lease storage capacity from the providers to store user, organization, or application data. Cloud storage services may be accessed through a collocated cloud computing service, a web service application programming interface (API) or by applications that use the API, such as cloud desktop storage, a cloud storage gateway or Web-based content management systems.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100. Storage device 16 may include but is not limited to: a hard disk drive; a RAID device; a random-access memory (RAM); a read-only memory (ROM); and all forms of flash memory storage devices.

As discussed above, various IO requests (e.g., IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e., a request that content 106 be written to storage system 12) and data read request 108 (i.e., a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100.

Processing node 100 may include cache memory system 110. Examples of cache memory system 110 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 106 within cache memory system 110. Depending upon the manner in which cache memory system 110 is configured, processing node 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 112).

In some implementations, storage system 12 may include multi-node active-active storage clusters configured to provide high availability to a user. As is known in the art, the term "high availability" may generally refer to systems or components that are durable and likely to operate continuously without failure for a long time. For example, an active-active storage cluster (e.g., computing cluster 114) may be formed from at least two nodes (e.g., processing nodes 100, 112), both actively running the same kind of service(s) simultaneously. One purpose of an active-active cluster (e.g., computing cluster 114) may be to achieve load balancing. Load balancing may distribute workloads across all nodes in order to prevent any single node from getting overloaded. Because there are more nodes available to serve, there will also be a marked improvement in throughput and response times. Another purpose of an active-active cluster (e.g., computing cluster 114) may be to provide at least one active node in the event that one of the nodes in the active-active cluster fails.

Log-Based Storage System:

Storage system 12 may be configured as a log-based storage system. If so configured, storage management process 10 may store received data in a log memory system (e.g., log memory system 116). As is known in the art, a log memory system (e.g., log memory system 116) may generally include one or more non-volatile random-access memory (NVRAM) devices configured to store a log of the data written to storage system 12.

As discussed above, an example of IO request 20 may include but is not limited to data write request 104 (i.e., a request that content 106 be written to storage system 12). Further and as discussed above, upon receiving data write request 104 and content 106, data write request 104 and content 106 may be written to cache memory system 110 (which may be volatile). However and when configured as a log-based storage system, upon receiving data write request 104 and content 106, data write request 104 and/or content 106 may also be written to log memory system 116 (which is persistent).

Therefore and through the use of log memory system 116, the content of cache memory system 110 (e.g., data write request 104 and content 106) may be recovered (via log memory system 116) in the event of a power failure and/or a failure of cache memory system 110. Further and due to such failure recoverability, data (e.g., content 106) may be considered to be persistently stored (i.e., as if stored in storage platform 102) once such data (e.g., content 106) is saved within log memory system 116. Therefore, once such data (e.g., content 106) is saved within log memory system 116, a write acknowledgement may be provided to the sender of data write request 104, acknowledging the successful saving of such data (e.g., content 106), wherein such data (e.g., content 106) may be subsequently written to storage platform 102.

Log memory system 116 may include a page buffer pool (e.g., page buffer pool 118) and/or a page descriptor ring buffer (e.g., page descriptor ring buffer 120) to effectuate the above-described temporary storage of (in this example) content 106. For example, storage management process 10 may store one or more pages (associated with content 106) in one or more page buffers within page buffer pool 118 based, at least in part, upon the processing of (in this example) write request 104. Further, storage management process 10 may store information concerning the data (e.g., content 106) stored within log memory system 116 in a page descriptor (e.g., page descriptor 122), wherein page descriptor 122 may generally include a reference (i.e., a pointer) to the related page buffer(s) within page buffer pool 118. Page descriptor 122 may also include a sequence transaction number that tracks the order of write operations and/or other types of information.

Storage management process 10 may store each page descriptor (e.g., page descriptor 122) in a page descriptor ring buffer (e.g., page descriptor ring buffer 120). As is known in the art, a page descriptor ring buffer may allow data to be added to the "head" of the page descriptor ring buffer and released or overwritten from the tail of the page descriptor ring buffer. Accordingly, page descriptor ring buffer 120 may appear to be circular in that older data is overwritten with newer data as data (e.g., content 106) is moved from page buffer pool 118 to storage platform 102.

Backend Storage Platform

Storage system 12 may utilize both types of media (e.g., hard disk drives and solid-state devices) to provide a high level of performance at an acceptable price point. Specifically, storage platform 102 within storage system 12 may be a multi-tier storage platform that includes multiple storage tiers of different storage types. For example, storage platform 102 within storage system 12 may include an SSD storage tier (e.g., SSD storage tier 124) and an HDD storage tier (e.g., HDD storage tier 126).

HDD storage tier 126 may include a plurality of storage targets $T_{1-n}$ (e.g. storage targets 128, 130, 132, 134, 136). Storage targets 128, 130, 132, 134, 136 may be configured to provide various levels of performance and/or high availability. For example, one or more of storage targets 128, 130, 132, 134, 136 may be configured as a RAID 0 array, in which data is striped across storage targets. By striping data across a plurality of storage targets, improved performance may be realized. However, RAID 0 arrays do not provide a level of high availability. Accordingly, one or more of storage targets 128, 130, 132, 134, 136 may be configured as a RAID 1 array, in which data is mirrored between storage targets. By mirroring data between storage targets, a level of high availability is achieved as multiple copies of the data are stored within storage system 12.

While storage targets 128, 130, 132, 134, 136 are discussed above as being configured in a RAID 0 or RAID 1 array, this is for illustrative purposes only and is not intended to be a limitation of this disclosure, as other configurations are possible. For example, storage targets 128, 130, 132, 134, 136 may be configured as a RAID 3, RAID 4, RAID 5 or RAID 6 array. While in this particular example, HDD storage tier 126 is shown to include five storage targets (e.g. storage targets 128, 130, 132, 134, 136), this is for illustrative purposes only and is not intended to be a limitation of this disclosure. Specifically, the actual number of storage targets may be increased or decreased depending upon e.g., the level of redundancy/performance/capacity required.

Storage Management Process:

As discussed above, as storage system 12 is utilized, multiple copies of single data files may be stored on storage system 12, resulting in considerable wasted storage space. In order to combat such duplicative storage of data files, deduplication methodologies may be employed to identify and eliminate such redundant data files.

Figure 3:
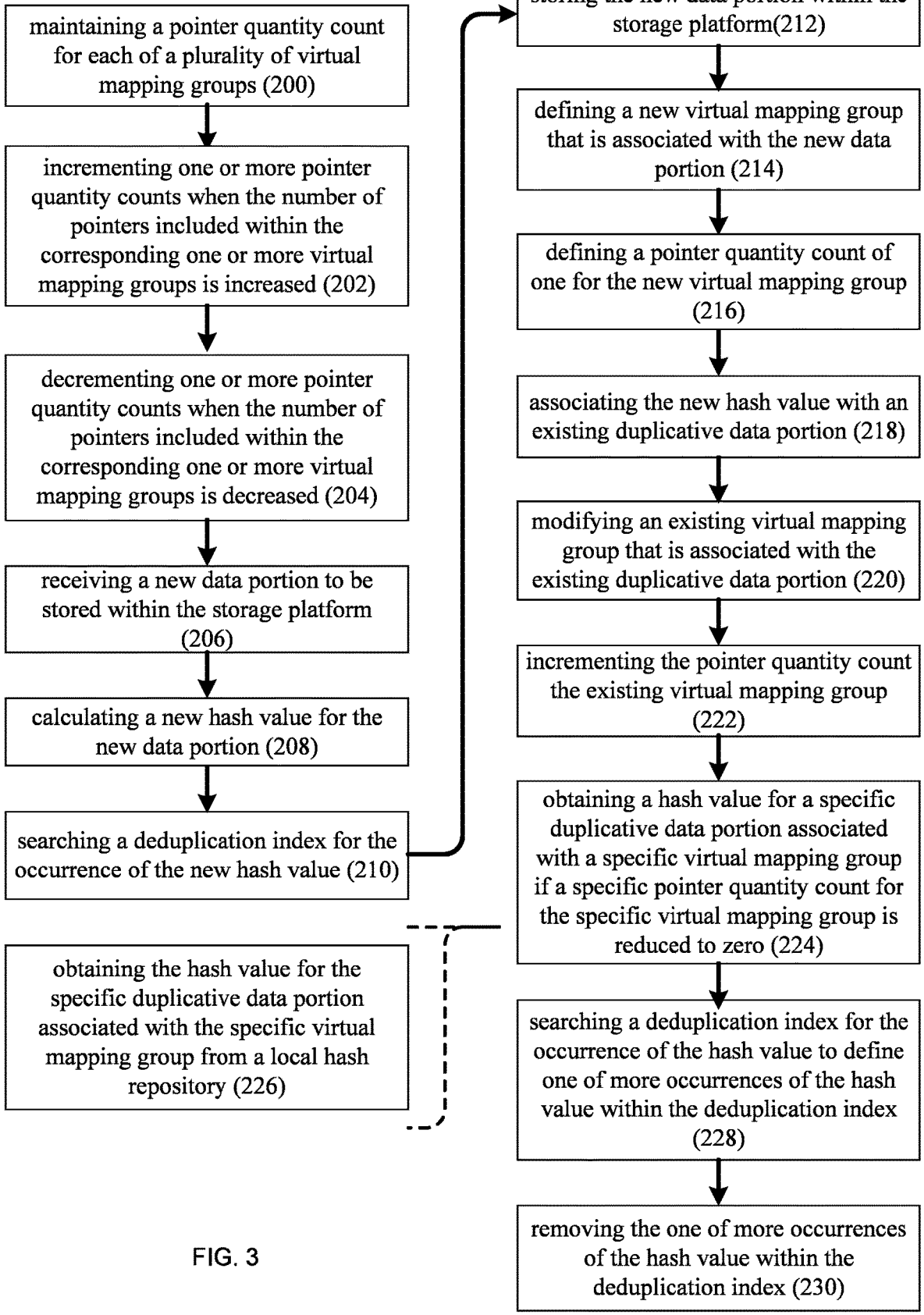
FIG. 3 is a flow chart of the storage management process of FIG. 1.
Figure 4:
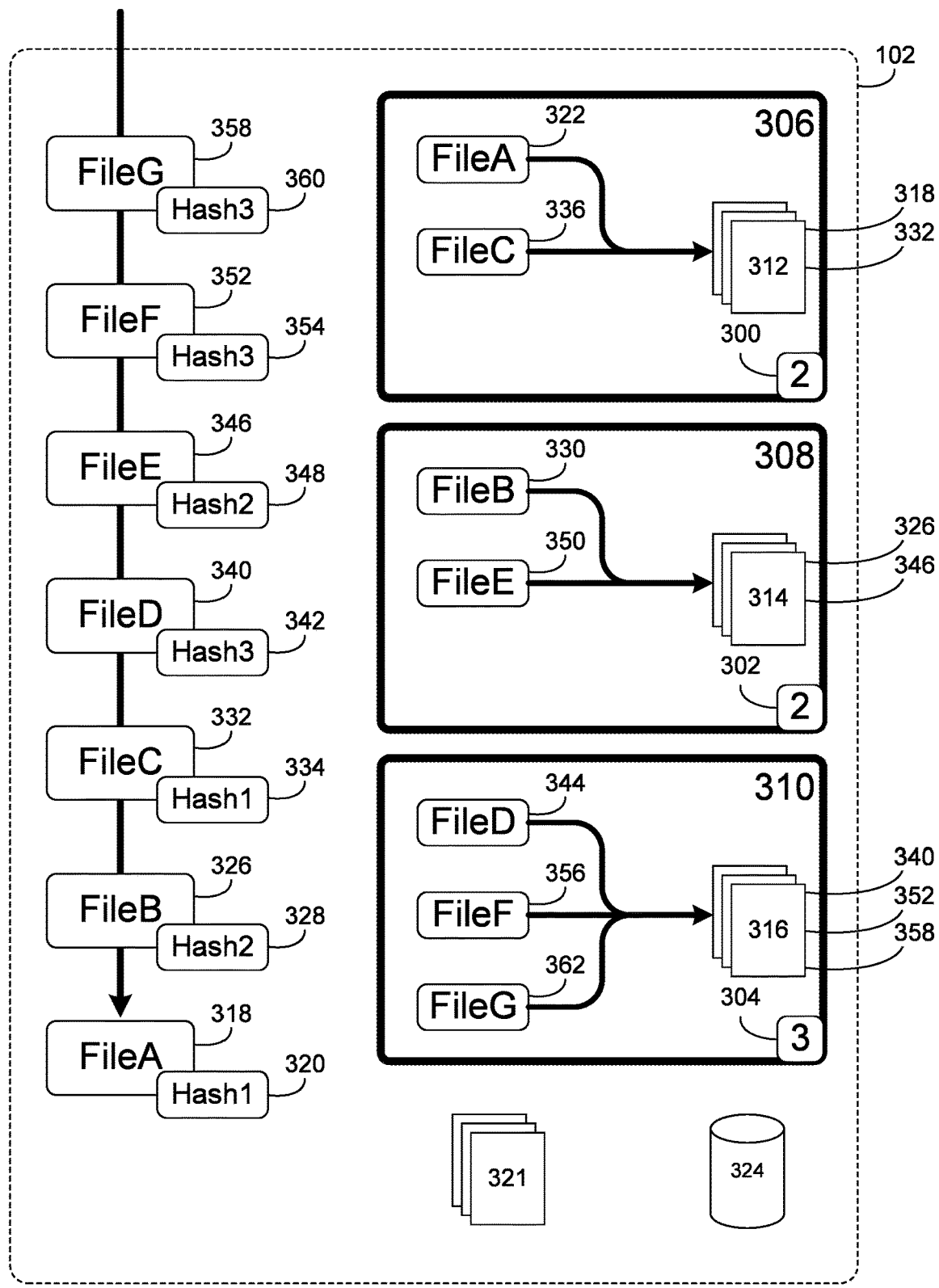
FIG. 4 is another diagrammatic view of the storage system of FIG. 1.

Referring also to FIGS. 3-4 and as will be discussed below in greater detail, storage management process 10 may maintain 200 a pointer quantity count (e.g., pointer quantity counts 300, 302, 304) for each of a plurality of virtual mapping groups (e.g., virtual mapping groups 306, 308, 310). Each virtual mapping group (e.g., each of virtual mapping groups 306, 308, 310) may be associated with a duplicative data portion (e.g., duplicative data portions 312, 314, 316) within a storage platform (e.g., storage platform 102). Examples of such duplicative data portions 312, 314, 316 may include but are not limited to whole data files, partial data files, memory pages, memory blocks, etc. Each pointer quantity count (e.g., pointer quantity counts 300, 302, 304) may define the number of pointers included within the corresponding virtual mapping group (e.g., one of virtual mapping group 306, 308, 310).

When maintaining 200 a pointer quantity count (e.g., pointer quantity counts 300, 302, 304) for each of a plurality of virtual mapping groups (e.g., virtual mapping groups 306, 308, 310), storage management process 10 may:
 increment 202 the one or more pointer quantity counts (e.g., one or more of pointer quantity counts 300, 302, 304) when the number of pointers included within the corresponding one or more virtual mapping groups (e.g., one or more of virtual mapping group 306, 308, 310) is increased; and/or
 decrement 204 the one or more pointer quantity counts (e.g., one or more of pointer quantity counts 300, 302, 304) when the number of pointers included within the corresponding one or more virtual mapping groups (e.g., one or more of virtual mapping group 306, 308, 310) is decreased.

Assume that upon storage system 12 being started, the storage platform (e.g., storage platform 102) has no data stored on it. Further and as discussed above, assume that during the operation of storage platform 102, data may be written to storage platform 102 after being received from processing node 100, processing node 112 and/or computing cluster 114. As discussed above, the storage system (e.g., storage system 12) may be a log-based storage system that includes log memory system 116 having one or more non-volatile random-access memory (NVRAM) devices configured to store a log of the data written to storage system 12. Accordingly and during operation of such a log-based system, data may be routinely "flushed" from log memory system 116 to storage platform 102. Upon arriving at storage platform 102, this data may be stored within storage platform 102.

During the operation of storage platform 102, storage management process 10 may receive 206 a new data portion (e.g., data portion 318) to be stored within the storage platform (e.g., storage platform 102) and may calculate 208 a new hash value (e.g., hash value 320) for the new data portion (e.g., data portion 318).

As is known in the art, a hash function is any function that can be used to map data of arbitrary size to fixed-size values. The values returned by a hash function are called hash values, hash codes, digests, or simply hashes. The values are usually used to index a fixed-size table called a hash table. Use of a hash function to index a hash table is called hashing or scatter storage addressing. Hash functions and their associated hash tables may be used in data storage and retrieval applications to access data in a small and nearly constant time per retrieval. They may require an amount of storage space only fractionally greater than the total space required for the data or records themselves. Hashing is a computationally and storage space-efficient form of data access that avoids the non-constant access time of ordered and unordered lists and structured trees, and the often exponential storage requirements of direct access of state spaces of large or variable-length keys. Use of hash functions may rely on statistical properties of key and function interaction: worst-case behavior is intolerably bad with a vanishingly small probability, and average-case behavior can be nearly optimal (minimal collision).

As discussed above, in order to combat duplicative storage of data files on storage platform 102, deduplication methodologies may be employed to identify and eliminate such redundant data files.

As is known in the art, data deduplication is a technique for eliminating duplicate copies of repeating data. Successful implementation of the technique may improve storage utilization, which may in turn lower capital expenditure by reducing the overall amount of storage media required to meet storage capacity needs. It may also be applied to network data transfers to reduce the number of bytes that must be sent. The deduplication process may require comparison of data 'chunks' (also known as 'byte patterns') which are unique, contiguous blocks of data. These chunks may be identified and stored during a process of analysis, and compared to other chunks within existing data. Whenever a match occurs, the redundant chunk is replaced with a small reference that points to the stored chunk. Given that the same byte pattern may occur dozens, hundreds, or even thousands of times (the match frequency is dependent on the chunk size), the amount of data that must be stored or transferred can be greatly reduced.

Storage management process 10 may maintain a deduplication index (e.g., deduplication index 321) for use with the above-described data deduplication operation. Specifically and as will be discussed below, deduplication index 321 may define (among other things) a hash value for each data portion stored within storage platform 102, as deduplication index 321 may organize information concerning the data portions based upon their respective hash values.

Accordingly and assuming that deduplication index 321 is properly maintained, if the hash value calculated 208 for a data portion received 206 for storage within storage platform 102 IS NOT in deduplication index 321, that data portion IS NOT currently stored within storage platform 102. Conversely, if the hash value calculated 208 for a data portion received 206 for storage within storage platform 102 IS in deduplication index 321, that data portion IS currently stored within storage platform 102. Accordingly, storage management process 10 may search 210 deduplication index 321 for the occurrence of the new hash value (e.g., hash value 320).

Generally speaking, if the new hash value (e.g., hash value 320) DOES NOT occur within deduplication index 321, storage management process 10 may:
- store 212 the new data portion (e.g., data portion 318) within the storage platform (e.g., storage platform 102),
- define 214 a new virtual mapping group that is associated with the new data portion (e.g., data portion 318); and
- define 216 a pointer quantity count of one for the new virtual mapping group.

Conversely, if the new hash value (e.g., hash value 320) DOES occur within deduplication index 321, storage management process 10 may:
- associate 218 the new hash value (e.g., hash value 320) with an existing duplicative data portion;
- modify 220 an existing virtual mapping group that is associated with the existing duplicative data portion, and
- increment 222 the pointer quantity count for the existing virtual mapping group.

The following discussion is a use case that explains the manner in which storage management process 10 may receive and process seven data portions (namely FileA→FileG).

The Arrival of FileA:
Storage management process 10 may receive 206 data portion 318 (i.e., FileA) for storage within storage platform 102 and may calculate 208 hash value 320 (i.e., Hash1) for data portion 318 (i.e., FileA). Once calculated 208, storage management process 10 may search 210 deduplication index 321 for the occurrence of hash value 320 (i.e., Hash1).

Being hash value 320 (i.e., Hash1) DOES NOT occur within deduplication index 321 (as this is the first unique data portion received), storage management process 10 may:
- store 212 data portion 318 (i.e., FileA) within storage platform 102,
- define 214 a new virtual mapping group (e.g., virtual mapping group 306) that is associated with data portion 318; and
- define 216 a pointer quantity count (e.g., pointer quantity count 300) of one for the new virtual mapping group (e.g., virtual mapping group 306), as there is currently only one pointer (e.g., pointer 322) within virtual mapping group 306.

Storage management process 10 may also store a copy of hash value 320 (i.e., Hash1) within hash repository 324 for future use with maintaining deduplication index 321 (as will be discussed below in greater detail).

The Arrival of FileB:
Storage management process 10 may receive 206 data portion 326 (i.e., FileB) for storage within storage platform 102 and may calculate 208 hash value 328 (i.e., Hash2) for data portion 326 (i.e., FileB). Once calculated 208, storage management process 10 may search 210 deduplication index 321 for the occurrence of hash value 328 (i.e., Hash2).

Being hash value 328 (i.e., Hash2) DOES NOT occur within deduplication index 321 (as this is the second unique data portion received), storage management process 10 may:
- store 212 data portion 326 (i.e., FileB) within storage platform 102;
- define 214 a new virtual mapping group (e.g., virtual mapping group 308) that is associated with data portion 326; and
- define 216 a pointer quantity count (e.g., pointer quantity count 302) of one for the new virtual mapping group (e.g., virtual mapping group 308), as there is currently only one pointer (e.g., pointer 330) within virtual mapping group 308.

Storage management process 10 may also store a copy of hash 328 (i.e., Hash2) within hash repository 324 for future use with maintaining deduplication index 321 (as will be discussed below in greater detail).

The Arrival of FileC:

Storage management process 10 may receive 206 data portion 332 (i.e., FileC) for storage within storage platform 102 and may calculate 208 hash value 334 (i.e., Hash1) for data portion 332 (i.e., FileC). Once calculated 208, storage management process 10 may search 210 deduplication index 321 for the occurrence of hash value 334 (i.e., Hash1).

Being hash value 334 (i.e., Hash1) DOES occur within deduplication index 321 (as this is the same as hash value 320), storage management process 10 may:

- associate 218 hash value 334 with an existing duplicative data portion (e.g., duplicative data portion 312);
- modify 220 an existing virtual mapping group (e.g., virtual mapping group 306) that is associated with the existing duplicative data portion (e.g., duplicative data portion 312); and
- increment 222 the pointer quantity count (e.g., pointer quantity count 300) for the existing virtual mapping group (e.g., virtual mapping group 306) from one to two, as there are currently two pointers (e.g., pointers 322, 336) within virtual mapping group 306.

The Arrival of FileD:

Storage management process 10 may receive 206 data portion 340 (i.e., FileD) for storage within storage platform 102 and may calculate 208 hash value 342 (i.e., Hash3) for data portion 340 (i.e., FileC). Once calculated 208, storage management process 10 may search 210 deduplication index 321 for the occurrence of hash value 342 (i.e., Hash3).

Being hash value 342 (i.e., Hash3) DOES NOT occur within deduplication index 321 (as this is the third unique data portion received), storage management process 10 may:

- store 212 data portion 340 (i.e., FileD) within storage platform 102;
- define 214 a new virtual mapping group (e.g., virtual mapping group 310) that is associated with data portion 340; and
- define 216 a pointer quantity count (e.g., pointer quantity count 304) of one for the new virtual mapping group (e.g., virtual mapping group 310), as there is currently only one pointer (e.g., pointer 344) within virtual mapping group 310.

Storage management process 10 may also store a copy of hash 342 (i.e., Hash3) within hash repository 324 for future use with maintaining deduplication index 321 (as will be discussed below in greater detail).

The Arrival of FileE:

Storage management process 10 may receive 206 data portion 346 (i.e., FileE) for storage within storage platform 102 and may calculate 208 hash value 348 (i.e., Hash2) for data portion 346 (i.e., FileE). Once calculated 208, storage management process 10 may search 210 deduplication index 321 for the occurrence of hash value 348 (i.e., Hash2).

Being hash value 348 (i.e., Hash2) DOES occur within deduplication index 321 (as this is the same as hash value 328), storage management process 10 may:

- associate 218 hash value 348 with an existing duplicative data portion (e.g., duplicative data portion 314);
- modify 220 an existing virtual mapping group (e.g., virtual mapping group 308) that is associated with the existing duplicative data portion (e.g., duplicative data portion 314); and
- increment 222 the pointer quantity count (e.g., pointer quantity count 302) for the existing virtual mapping group (e.g., virtual mapping group 308) from one to two, as there are currently two pointers (e.g., pointers 330, 350) within virtual mapping group 306.

The Arrival of FileF:

Storage management process 10 may receive 206 data portion 352 (i.e., FileF) for storage within storage platform 102 and may calculate 208 hash value 354 (i.e., Hash3) for data portion 352 (i.e., FileF). Once calculated 208, storage management process 10 may search 210 deduplication index 321 for the occurrence of hash value 354 (i.e., Hash3).

Being hash value 354 (i.e., Hash3) DOES occur within deduplication index 321 (as this is the same as hash value 342), storage management process 10 may:

- associate 218 hash value 354 with an existing duplicative data portion (e.g., duplicative data portion 316);
- modify 220 an existing virtual mapping group (e.g., virtual mapping group 310) that is associated with the existing duplicative data portion (e.g., duplicative data portion 316); and
- increment 222 the pointer quantity count (e.g., pointer quantity count 304) for the existing virtual mapping group (e.g., virtual mapping group 310) from one to two, as there are currently two pointers (e.g., pointers 344, 356) within virtual mapping group 310.

The Arrival of FileG:

Storage management process 10 may receive 206 data portion 358 (i.e., FileG) for storage within storage platform 102 and may calculate 208 hash value 360 (i.e., Hash3) for data portion 358 (i.e., FileG). Once calculated 208, storage management process 10 may search 210 deduplication index 321 for the occurrence of hash value 360 (i.e., Hash3).

Being hash value 360 (i.e., Hash3) DOES occur within deduplication index 321 (as this is the same as hash values 342, 354), storage management process 10 may:

- associate 218 hash value 360 with an existing duplicative data portion (e.g., duplicative data portion 316);
- modify 220 an existing virtual mapping group (e.g., virtual mapping group 310) that is associated with the existing duplicative data portion (e.g., duplicative data portion 316); and
- increment 222 the pointer quantity count (e.g., pointer quantity count 304) for the existing virtual mapping group (e.g., virtual mapping group 310) from two to three, as there are currently three pointers (e.g., pointers 344, 356, 362) within virtual mapping group 310.

Accessing of Files:

So in the above-stated example, seven files (e.g., FileA→FileG) are received for storage on storage platform 102, where only three of the files are unique (e.g., FileA, FileB & FileD). Specifically: FileA & FileC are the same (as evidenced by Hash1); FileB & FileE are the same (as evidenced by Hash2); and FileD, FileF & FileG are the same (as evidenced by Hash3). Accordingly: FileA is saved first as duplicative data portion 312 with: pointer 322 pointing to duplicative data portion 312 for FileA and pointer 336 pointing to duplicative data portion 312 for FileC; FileB is saved first as duplicative data portion 314 with: pointer 330 pointing to duplicative data portion 314 for FileB and pointer 350 pointing to duplicative data portion 314 for FileE; and FileC is saved first as duplicative data portion 316 with: pointer 344 pointing to duplicative data portion 316 for FileD, pointer 356 pointing to duplicative data portion 316 for FileF and pointer 362 pointing to duplicative data portion 316 for FileG.

Accordingly and continuing with the above-stated example:

- If an IO request (e.g., read request 108) for FileA is received on storage platform 102, pointer 322 may be utilized to access duplicative data portion 312 (which is identical to FileA);
- If an IO request (e.g., read request 108) for FileB is received on storage platform 102, pointer 330 may be utilized to access duplicative data portion 314 (which is identical to FileB);
- If an IO request (e.g., read request 108) for FileC is received on storage platform 102, pointer 336 may be utilized to access duplicative data portion 312 (which is identical to FileC);
- If an IO request (e.g., read request 108) for FileD is received on storage platform 102, pointer 344 may be utilized to access duplicative data portion 316 (which is identical to FileD);
- If an IO request (e.g., read request 108) for FileE is received on storage platform 102, pointer 350 may be utilized to access duplicative data portion 314 (which is identical to FileE);
- If an IO request (e.g., read request 108) for FileF is received on storage platform 102, pointer 356 may be utilized to access duplicative data portion 316 (which is identical to FileF); and
- If an IO request (e.g., read request 108) for FileG is received on storage platform 102, pointer 362 may be utilized to access duplicative data portion 316 (which is identical to FileG).

Deletion of Files:

Assume that during use of storage platform 102, various data portions are deleted. For example, assume that data portion 318 (i.e., FileA) and data portion 332 (i.e., FileC) are both deleted, resulting in no data portions being associated with duplicative data portion 312. As discussed above, storage management process 10 may decrement 204 the one or more pointer quantity counts (e.g., one or more of pointer quantity counts 300, 302, 304) when the number of pointers included within the corresponding one or more virtual mapping groups (e.g., one or more of virtual mapping group 306, 308, 310) is decreased. Accordingly, pointer quantity count 300 may be decremented from two to one upon the deletion of data portion 318 (i.e., FileA) and pointer quantity count 300 may be decremented from one to zero upon the deletion of data portion data portion 332 (i.e., FileC).

Accordingly and in response to such decrementation to zero, storage management process 10 may obtain 224 a hash value (e.g., Hash1) for the specific duplicative data portion (e.g., duplicative data portion 312) associated with the specific virtual mapping group (e.g., specific virtual mapping group 306) if the specific pointer quantity count (e.g., pointer quantity counts 300) for the specific virtual mapping group (e.g., specific virtual mapping group 306) is reduced to zero.

When obtaining 224 the hash value (e.g., Hash1) for the specific duplicative data portion (e.g., duplicative data portion 312) associated with the specific virtual mapping group (e.g., specific virtual mapping group 306) if the specific pointer quantity count (e.g., pointer quantity count 300) for the specific virtual mapping group (e.g., specific virtual mapping group 306) is reduced to zero, storage management process 10 may: obtain 226 the hash value (e.g., Hash1) for the specific duplicative data portion (e.g., duplicative data portion 312) associated with the specific virtual mapping group (e.g., specific virtual mapping group 306) from a local hash repository (e.g., hash repository 324 which may be locally-stored within storage platform 102).

As stated above, hash repository 324 may be locally-stored within storage platform 102. And as hash repository 324 is locally-stored, the performance of storage system 12 may be greatly enhanced. In the past, there was no local repository of hash values. Accordingly and when such a hash value was needed, the related file would need to be obtained (which is an IO operation) . . . and then the file may need to be decompressed which may involve hardware (if the file is stored in a compressed state) . . . and then a hash value would need to be calculated for the decompressed file (which is computationally expensive). Thus, storage system 12 would either absorb the permeance penalty of keeping deduplication index 321 up-to-date, or sometimes, storage system 12 will skip the required cleanup of deduplication index 321, resulting in stale entries within deduplication index 321. Accordingly and through the use of such a locally-stored hash repository 324, the need to obtain/decompress/calculate is no longer needed, thus greatly enhancing the efficiency of storage system 12. Further, the size of hash repository 324 may be increased/decreased dynamically. For example, hash repository 324 may be configured to utilize "spare space" within storage system 12, wherein such "spare space" may be defragmentation e.g., unused space that is available for thinly-provisioned storage space within storage system 12. Accordingly and in the event that such "spare space" becomes needed by such thinly-provisioned" storage space, hash repository 324 may relinquish such "spare space" and dynamically recalculate any missing hashes that were lost when hash repository 324 relinquished some of its space. Accordingly, in the event of a reduction in the size of hash repository 324 and/or the unavailability of hash repository 324, storage management process 10 may be able to failback and once again dynamically calculate hashes on an as-needed basis.

Hash repository 324 may be configured to store complete hashes or smaller partial hashes. For example and when configured for storing complete hashes, Hash1, Hash2 and/or Hash3 may be complete hashes of duplicative data portion 312, 314, 316 respectively. Alternatively and when configured for storing partial hashes, Hash1, Hash2 and/or Hash3 may be partial hashes of duplicative data portion 312, 314, 316 respectively, wherein complimentary portions of these hashes (e.g., Hash1, Hash2 and/or Hash3) may be stored in other memory systems (e.g., Virtual Large Blocks) available to storage management process 10. For example, each of the virtual mapping groups (e.g., virtual mapping groups 306, 308, 310) may be stored in a VLB. Further and as discussed above, each of the virtual mapping groups (e.g., virtual mapping groups 306, 308, 310) may include one or more pointers. Therefore. each of these pointers may include/define complimentary portions of these hashes (e.g., Hash1, Hash2 and/or Hash3) that act like "fingerprints" of the data that is located by these pointers.

Additionally, as there are more advanced deduplication mechanisms (e.g., unaligned deduplication or similarity deduplication), hash repository 324 may be configured to store advanced hashes that may be required/utilized by such advanced deduplication mechanisms.

Upon obtaining 224 the hash value (e.g., Hash1), storage management process 10 may search 228 the deduplication index (e.g., deduplication index 321) for the occurrence of the hash value (e.g., Hash1) to define one of more occurrences of the hash value (e.g., Hash1) within deduplication index 22. Storage management process 10 may then remove 230 the one of more occurrences of the hash value (e.g., Hash1) within deduplication index 321, thus maintaining deduplication index 321 current. Specifically, being duplicative data portion 312 is no longer being pointed to within specific virtual mapping group 306 (as pointer quantity count 300 was decremented to zero), storage management process 10 may delete duplicative data portion 312 from storage platform 102.

As discussed above, deduplication index 321 may define (among other things) a hash value for each data portion stored within storage platform 102, as deduplication index 321 may organize information concerning these data portions based upon their respective hash values. Accordingly, being duplicative data portion 312 is no longer needed, any references to its hash value (e.g., Hash1) within deduplication index 321 are also so longer needed. Therefore, storage management process 10 may now remove 230 any occurrences of this hash value (e.g., Hash1) within deduplication index 321.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device comprising:
    maintaining a pointer quantity count for each of a plurality of virtual mapping groups, wherein each virtual mapping group is associated with a duplicative data portion within a storage platform and each pointer quantity count defines the number of pointers included within the corresponding virtual mapping group;
    determining that a specific pointer quantity count for a specific virtual mapping group is reduced to zero;
    obtaining a hash value for the specific duplicative data portion associated with the specific virtual mapping group from a locally-stored hash repository using the specific virtual mapping group in response to the specific pointer quantity count for the specific virtual mapping group being reduced to zero, wherein the hash value is a hash representation of the specific duplicative data portion, wherein the locally-stored hash repository of hash values is defined from thinly-provisioned defragmentation space in the storage platform;
    searching a deduplication index for the occurrence of the hash value for the specific duplicative data portion associated with the specific virtual mapping group to define one or more occurrences of the hash value within the deduplication index, wherein the deduplication index is a separate data structure from the locally-stored hash repository; and
    removing the one or more occurrences of the hash value within the deduplication index.

2. The computer-implemented method of claim 1 wherein maintaining a pointer quantity count for each of a plurality of virtual mapping groups includes one or more of:
    incrementing one or more pointer quantity counts when the number of pointers included within the corresponding one or more virtual mapping groups is increased; and
    decrementing one or more pointer quantity counts when the number of pointers included within the corresponding one or more virtual mapping groups is decreased.

3. The computer-implemented method of claim 1 further comprising:
    receiving a new data portion to be stored within the storage platform;
    calculating a new hash value for the new data portion; and
    searching a deduplication index for the occurrence of the new hash value.

4. The computer-implemented method of claim 3 further comprising:
    if the new hash value does not occur within the deduplication index:
        storing the new data portion within the storage platform,
        defining a new virtual mapping group that is associated with the new data portion; and
        defining a pointer quantity count of one for the new virtual mapping group.

5. The computer-implemented method of claim 3 further comprising:
    if the new hash value does occur within the deduplication index:
        associating the new hash value with an existing duplicative data portion;
        modifying an existing virtual mapping group that is associated with the existing duplicative data portion, and
        incrementing the pointer quantity count the existing virtual mapping group.

6. A computer program product residing on a non-transitory computer readable medium having a plurality of instructions stored thereon which, when executed by a processor, cause the processor to perform operations comprising:
    maintaining a pointer quantity count for each of a plurality of virtual mapping groups, wherein each virtual mapping group is associated with a duplicative data portion within a storage platform and each pointer quantity count defines the number of pointers included within the corresponding virtual mapping group;
    determining that a specific pointer quantity count for a specific virtual mapping group is reduced to zero;
    obtaining a hash value for the specific duplicative data portion associated with the specific virtual mapping group from a locally-stored hash repository using the specific virtual mapping group in response to the specific pointer quantity count for the specific virtual mapping group being reduced to zero, wherein the hash value is a hash representation of the specific duplicative data portion, wherein the locally-stored hash repository of hash values is defined from thinly-provisioned defragmentation space in the storage platform;
    searching a deduplication index for the occurrence of the hash value for the specific duplicative data portion associated with the specific virtual mapping group to define one or more occurrences of the hash value within the deduplication index, wherein the deduplication index is a separate data structure from the locally-stored hash repository; and
    removing the one or more occurrences of the hash value within the deduplication index.

7. The computer program product of claim 6 wherein maintaining a pointer quantity count for each of a plurality of virtual mapping groups includes one or more of:
  incrementing one or more pointer quantity counts when the number of pointers included within the corresponding one or more virtual mapping groups is increased; and
  decrementing one or more pointer quantity counts when the number of pointers included within the corresponding one or more virtual mapping groups is decreased.

8. The computer program product of claim 6 further comprising:
  receiving a new data portion to be stored within the storage platform;
  calculating a new hash value for the new data portion; and
  searching a deduplication index for the occurrence of the new hash value.

9. The computer program product of claim 8 further comprising:
  if the new hash value does not occur within the deduplication index:
    storing the new data portion within the storage platform,
    defining a new virtual mapping group that is associated with the new data portion; and
    defining a pointer quantity count of one for the new virtual mapping group.

10. The computer program product of claim 8 further comprising:
  if the new hash value does occur within the deduplication index:
    associating the new hash value with an existing duplicative data portion;
    modifying an existing virtual mapping group that is associated with the existing duplicative data portion, and
    incrementing the pointer quantity count the existing virtual mapping group.

11. A computing system including a processor and memory configured to perform operations comprising:
  maintaining a pointer quantity count for each of a plurality of virtual mapping groups, wherein each virtual mapping group is associated with a duplicative data portion within a storage platform and each pointer quantity count defines the number of pointers included within the corresponding virtual mapping group;
  determining that a specific pointer quantity count for a specific virtual mapping group is reduced to zero;
  obtaining a hash value for the specific duplicative data portion associated with the specific virtual mapping group from a locally-stored hash repository using the specific virtual mapping group in response to the specific pointer quantity count for the specific virtual mapping group being reduced to zero, wherein the hash value is a hash representation of the specific duplicative data portion, wherein the locally-stored hash repository of hash values is defined from thinly-provisioned defragmentation space in the storage platform;
  searching a deduplication index for the occurrence of the hash value for the specific duplicative data portion associated with the specific virtual mapping group to define one or more occurrences of the hash value within the deduplication index, wherein the deduplication index is a separate data structure from the locally-stored hash repository; and
  removing the one or more occurrences of the hash value within the deduplication index.

12. The computing system of claim 11 wherein maintaining a pointer quantity count for each of a plurality of virtual mapping groups includes one or more of:
  incrementing one or more pointer quantity counts when the number of pointers included within the corresponding one or more virtual mapping groups is increased; and
  decrementing one or more pointer quantity counts when the number of pointers included within the corresponding one or more virtual mapping groups is decreased.

13. The computing system of claim 11 further comprising:
  receiving a new data portion to be stored within the storage platform;
  calculating a new hash value for the new data portion; and
  searching a deduplication index for the occurrence of the new hash value.

14. The computing system of claim 13 further comprising:
  if the new hash value does not occur within the deduplication index:
    storing the new data portion within the storage platform,
    defining a new virtual mapping group that is associated with the new data portion, and
    defining a pointer quantity count of one for the new virtual mapping group; and
  if the new hash value does occur within the deduplication index:
    associating the new hash value with an existing duplicative data portion,
    modifying an existing virtual mapping group that is associated with the existing duplicative data portion, and
    incrementing the pointer quantity count the existing virtual mapping group.

* * * * *